United States Patent
Tweedt et al.

(10) Patent No.: US 11,286,955 B2
(45) Date of Patent: Mar. 29, 2022

(54) DUCTED FAN WITH FAN CASING DEFINING AN OVER-ROTOR CAVITY

(71) Applicant: General Electric Company, Schenectady, NY (US)

(72) Inventors: Daniel Lawrence Tweedt, West Chester, OH (US); Syed Arif Khalid, West Chester, OH (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 16/599,459

(22) Filed: Oct. 11, 2019

(65) Prior Publication Data

US 2021/0108653 A1   Apr. 15, 2021

(51) Int. Cl.
*F04D 29/54*   (2006.01)
*F04D 19/00*   (2006.01)

(52) U.S. Cl.
CPC ......... *F04D 29/547* (2013.01); *F04D 19/002* (2013.01); *F04D 29/542* (2013.01); *F05B 2240/14* (2013.01); *F05B 2250/183* (2013.01); *F05B 2250/71* (2013.01)

(58) Field of Classification Search
None
See application file for complete search history.

(56) References Cited

U.S. PATENT DOCUMENTS

| | | |
|---|---|---|
| 2,084,462 A | 6/1937 | Stalker |
| 3,127,093 A | 3/1964 | Sudrow |
| 4,239,452 A | 12/1980 | Roberts, Jr. |
| 4,540,335 A | 9/1985 | Yamaguchi |
| 4,958,987 A * | 9/1990 | Billingsley ........... F04D 29/281 241/46.17 |
| 5,049,033 A | 9/1991 | Corsmeier et al. |
| 5,092,737 A | 3/1992 | Lau |
| 5,275,531 A | 1/1994 | Roberts |
| 5,681,145 A * | 10/1997 | Neely .................. F04D 29/328 415/119 |
| 6,935,836 B2 | 8/2005 | Ress, Jr. et al. |
| 6,971,841 B2 * | 12/2005 | Care ..................... F04D 29/526 415/9 |
| 7,125,217 B2 * | 10/2006 | Care ..................... F04D 29/164 415/9 |
| 7,220,097 B2 | 5/2007 | Boeck |
| 7,686,569 B2 | 3/2010 | Paprotna et al. |

(Continued)

FOREIGN PATENT DOCUMENTS

CN   107672802   2/2018

*Primary Examiner* — Michael Lebentritt
(74) *Attorney, Agent, or Firm* — Fitch, Even, Tabin & Flannery LLP

(57) ABSTRACT

A ducted fan is provided including a fan casing surrounding a plurality of fan blades mounted to a rotating drive shaft. The plurality of blades define a tip stagger angle of greater than 68 degrees and the fan casing defines an annular recess defined by an inner wall of the fan casing, the annular recess extending about the circumferential direction proximate a blade tip of each of the plurality of blades. The annular recess may define an average recess depth greater than 10 percent of the tip chord length. The annular recess may also define a length ratio equal to a recess length over the tip axial chord length that is greater than 1.5.

26 Claims, 7 Drawing Sheets

(56) References Cited

U.S. PATENT DOCUMENTS

| | | | |
|---|---|---|---|
| 2004/0022625 A1* | 2/2004 | Care | F04D 29/164 415/173.3 |
| 2005/0053493 A1* | 3/2005 | Chung | F24F 1/38 417/423.3 |
| 2005/0111968 A1 | 5/2005 | Lapworth | |
| 2007/0212217 A1* | 9/2007 | Northfield | F04D 29/164 415/200 |
| 2010/0074728 A1* | 3/2010 | Sinzaki | F04D 29/66 415/119 |
| 2011/0070072 A1* | 3/2011 | Subramaniyan | F01D 11/08 415/173.2 |
| 2012/0057971 A1* | 3/2012 | Mitsuishi | F04D 29/4213 415/204 |
| 2016/0348691 A1* | 12/2016 | Gallagher | F04D 29/325 |
| 2018/0230912 A1* | 8/2018 | Hasel | F02C 7/06 |
| 2018/0274368 A1* | 9/2018 | Mongillo | F01D 5/187 |

\* cited by examiner

DUCTED FAN WITH FAN CASING DEFINING AN OVER-ROTOR CAVITY

FIELD

The present subject matter relates generally to ducted fans with improved performance and efficiency, and more particularly, the present subject matter relates to improved fan casings for ducted fans with vertical flight and hover modes of operation.

BACKGROUND

Ducted fans with low flow coefficients (e.g., less than 0.36) typically have a very high blade tip stagger angle (e.g., greater than 70 degrees). At such high stagger angles, the blade tip section is nearly aligned with a circumferential direction or direction of fan rotation, and is thus almost perpendicular to the main flow of air through the ducted fan. Consequently, strong reversed air flow or clearance flow exists through a tip clearance defined between the blade tip and an adjacent duct surface. In addition, the trailing blade tip vortices induce reversed air flow at the duct surface. These clearance flows and blade tip vortices may result in significant operating losses and inefficiencies.

For example, performance losses may be associated with substantial flow recirculation at the rotor tip that can have a strong adverse effect on the duct surface boundary layer. Specifically, this reverse airflow and blade tip vortex effectively block the near-tip primary flow, causing the duct-wall boundary layer downstream of the fan to be separated or to retain little or no throughflow momentum. As such, the boundary layer has substantial flow area blockage, even if still generally attached, and it lacks sufficient momentum to avoid separation later in the presence of an adverse pressure gradient (e.g., associated with increasing duct area).

Larger tip clearances may be desirable for certain conventional low flow coefficient ducted fans. For example, fans with large tip clearances are geometrically simple, easy to implement/fabricate, and are expected to have little or no weight penalty. In addition, there is less risk of blade tip rubs and rub-related problems or failures. Moreover, such designs have larger allowable fabrication and manufacturing tolerances, so parts and assembly are cheaper and there is greater flexibility in material selection. However, a large tip clearance between the blade tip and duct inner surface intensifies the adverse interaction, resulting in severe penalties in both performance and operational stability. Smaller tip clearances may reduce the issues related to boundary layer disruption near the duct, at least in the absence of inlet flow distortion, but may increase the likelihood of blade strike and may complicate the mechanical design of the fan.

Because reverse flow and boundary layer blockage in the downstream duct greatly reduce fan flow and thrust, insufficient tolerance to this condition could lead to sudden changes in flow and thrust, e.g., during hover operation or other operating scenarios that might result in varying inlet flow distortion. Fan ducts with a diffusing downstream section, also desirable for many applications, exacerbate this behavior.

Accordingly, a ducted fan with improved hover performance and operational stability would be useful. More specifically, a ducted fan with features for reducing adverse effects of boundary layer disruption, clearance flow, and blade tip vortices would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment a ducted fan is provided defining an axial direction, a radial direction, and a circumferential direction, the ducted fan comprising: a fan casing extending about the circumferential direction and defining a flow passageway; a drive shaft positioned within the fan casing and being rotatable about the axial direction; a plurality of blades operably coupled to the drive shaft and extending substantially along the radial direction toward the fan casing, the plurality of blades defining a tip stagger angle of greater than 68 degrees; and a recess defined by an inner wall of the fan casing, the recess extending about the circumferential direction proximate a blade tip of each of the plurality of blades.

The ducted fan may include a recess defining an average recess depth measured along the radial direction, the average recess depth being greater than 0.5 percent of a tip radius of the plurality of blades. The recess may define a recess length measured along the axial direction, wherein the recess length may be greater than a tip axial chord length plus 1 percent of the tip radius of the plurality of blades. A tip stagger angle of the plurality of blades may be greater than about 74 degrees. An average recess depth may be greater than 1 percent of the tip radius of the plurality of blades. A recess length may be greater than a tip axial chord length plus 2 percent of the tip radius of the plurality of blades. The tip stagger angle of the plurality of blades may be greater than about 80 degrees. The average recess depth may be greater than 1.5 percent of the tip radius of the plurality of blades. The recess length may be greater than the tip axial chord length plus 3 percent of the tip radius of the plurality of blades. The blade tip of each of the plurality of blades may be substantially aligned with a reference surface that extends between the inner wall forward of the recess and the inner wall aft of the recess. The blade tip of each of the plurality of blades may be positioned at least partially within the recess. The annular recess may be axisymmetric.

In another exemplary embodiment, a ducted fan is provided defining an axial direction, a radial direction, and a circumferential direction, the ducted fan comprising: a fan casing extending about the circumferential direction and defining a flow passageway; a drive shaft positioned within the fan casing and being rotatable about the axial direction; a plurality of blades operably coupled to the drive shaft and extending substantially along the radial direction toward the fan casing, the plurality of blades of the ducted fan operating at a flow coefficient based on a blade tip speed of less than 0.4; and a recess defined by an inner wall of the fan casing, the recess extending about the circumferential direction proximate a blade tip of each of the plurality of blades.

The recess of the ducted fan may define an average recess depth measured along the radial direction, the average recess depth being greater than 0.5 percent of a tip radius of the plurality of blades. The recess may also define a recess length measured along the axial direction, wherein the recess length may be greater than a tip axial chord length plus 2 percent of the tip radius of the plurality of blades. The flow coefficient of the ducted fan may be less than 0.25. The average recess depth may be greater than 1.5 percent of the tip radius of the plurality of blades. The blade tip of each of the plurality of blades may be positioned at least partially within the recess. The annular recess may be axisymmetric.

In another exemplary embodiment, a ducted fan is provided defining an axial direction, a radial direction, and a circumferential direction, the ducted fan comprising: a fan casing extending about the circumferential direction and defining a flow passageway; a drive shaft positioned within the fan casing and being rotatable about the axial direction; a plurality of blades operably coupled to the drive shaft and extending substantially along the radial direction toward the fan casing; and a recess defined by an inner wall of the fan casing proximate a blade tip of each of the plurality of blades, wherein the recess defines an average recess depth measured along the radial direction, the average recess depth being greater than 1.0 percent of a tip radius of the plurality of blades.

The recess of the ducted fan may define a recess length measured along the axial direction, wherein the recess length may be greater than a tip axial chord length plus 2 percent of a tip radius of the plurality of blades. The plurality of blades may define a tip stagger angle of greater than 68 degrees. An average tip clearance may be defined between the blade tip of each of the plurality of blades and the inner wall of the fan casing, the average tip clearance being greater than 1 percent of a radius circumscribed by the blade tip of each of the plurality of blades. The annular recess may be axisymmetric. The blade tip of each of the plurality of blades may be positioned at least partially within the recess. The blade tip of each of the plurality of blades may be positioned at least partially within the recess.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
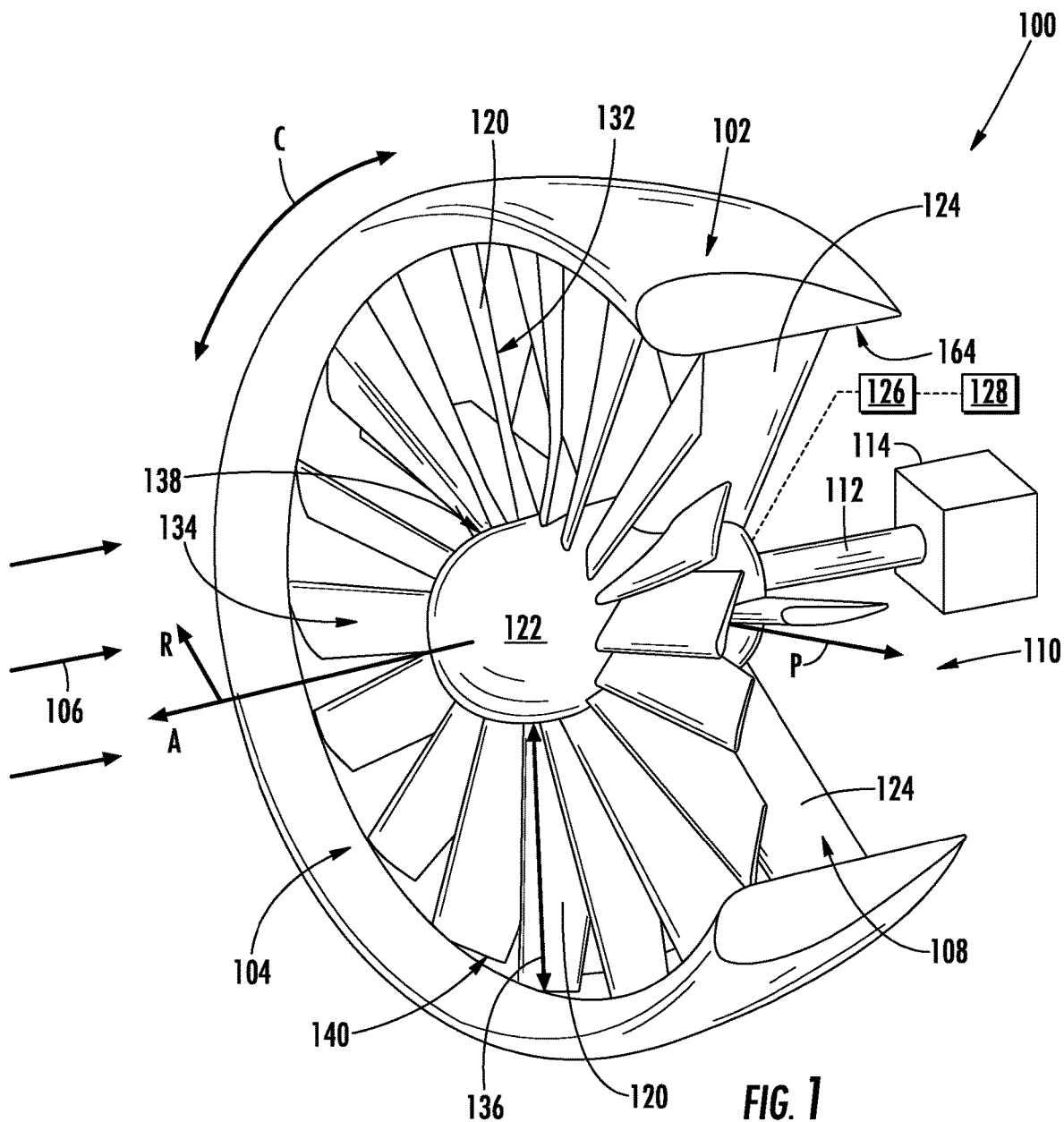
FIG. 1 provides a partial perspective view of an exemplary ducted fan according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. In addition, terms of approximation, such as "approximately," "substantially," or "about," refer to being within a ten percent margin of error.

Aspects of the present disclosure are directed to a ducted fan including a fan casing surrounding a plurality of fan blades mounted to a rotating drive shaft. The plurality of blades define a tip stagger angle of greater than 68 degrees and the fan casing defines an annular recess defined by an inner wall of the fan casing, the annular recess extending about the circumferential direction proximate a blade tip of each of the plurality of blades. The annular recess may define an average recess depth greater than 10 percent of the tip chord length. The annular recess may also define a length ratio equal to a recess length over the tip axial chord length that is greater than 1.5.

FIG. 1 provides a partial perspective view of a ducted fan 100 in accordance with an exemplary embodiment of the present disclosure. As illustrated, ducted fan 100 defines an axial direction A, a radial direction R, and a circumferential direction C. Ducted fan 100 generally includes a substantially tubular fan casing 102 that extends around the circumferential direction C and defines an annular inlet 104 for receiving a flow of air 106. More specifically, fan casing 102 may define a flow passageway 108 and ducted fan 100 may include a fan assembly 110 positioned within fan casing 102 for drawing in and urging the flow of air 106 through flow passageway 108.

Referring still to the exemplary embodiment of FIG. 1, fan assembly 110 includes a drive shaft 112 rotatably positioned within flow passageway 108 and being rotatable about the axial direction A. Drive shaft 112 may be operably coupled to a drive motor 114 that is configured for selectively rotating drive shaft 112. Although drive shaft 112 is illustrated herein as being operably coupled to drive motor 114, it should be appreciated that according to alternative embodiments, drive shaft 112 may be mechanically coupled to any other suitable drive mechanism, such as one or more shafts of the gas turbine engine or another suitable rotating member.

Fan assembly 110 may further include a plurality of blades 120 which are operably coupled to drive shaft 112 and extend substantially along the radial direction R toward fan casing 102. According to the illustrated embodiment, blades 120 are fan blades, but it should be appreciated that according to alternative embodiments, ducted fan 100 may include any other suitable blade or airfoil, such as turbine blades, compressor blades, etc. Blades 120 may be coupled to drive shaft 112 in any suitable manner. For example, according to the illustrated embodiment, blades 120 are coupled to a disk (not shown) in a spaced apart manner along the circumferential direction C. The disk may be covered by a rotatable front nacelle 122 that is aerodynamically contoured to promote the flow of air 106 through the plurality of blades 120 and through flow passageway 108.

For the embodiment depicted, the plurality of blades 120 are fixed pitch blades which may be mounted to the disk or drive shaft 112 in any suitable manner, e.g., via dovetails, press fit, welding, mechanical fasteners, etc. However, according to alternative embodiments, fan assembly 110 may be a variable pitch fan assembly which includes blade pitch mechanisms 123 (see, e.g., FIGS. 5-7) for selectively rotating each of the plurality of fan blades 120 about a pitch axis P. In addition, according to the illustrated embodiment, fan assembly 110 may include a plurality of circumferentially spaced guide vanes or struts 124 that are stationary and extend between fan casing 102 and a stationary portion of ducted fan 100 that surrounds drive shaft 112.

Ducted fan 100 may generally be used in any suitable application and may include variations and modifications while remaining within the scope of the present subject matter. For example, for reasons described in more detail below, ducted fan 100 may include blades 120 having a high stagger angle such that ducted fan 100 may be particularly suited for operating at low flow coefficients. In this regard, ducted fan 100 may be particularly suited for hovering applications, personal mobility device applications, or for vertical takeoff and landing (VTOL) aircraft. However, it should be appreciated that according to alternative embodiments, ducted fan 100 may house any other suitable type of rotary blades for performing any other suitable function. In this regard, for example, aspects of the present subject matter may be extended to a compressor 126 or turbine 128 of a gas turbine engine (both illustrated schematically in FIG. 1), or to any other suitable ducted fan. According to such an embodiment ducted fan 100 may be a fan of the gas turbine engine that may include a core engine including compressor 126 and turbine 128. Thus, it should be appreciated that the exemplary ducted fan 100 illustrated in FIG. 1 is provided by way of example only, and that in other exemplary embodiments, the ducted fan 100 may have any other suitable configuration and the present subject matter may be applicable to other types of turbomachinery.

Figure 2:
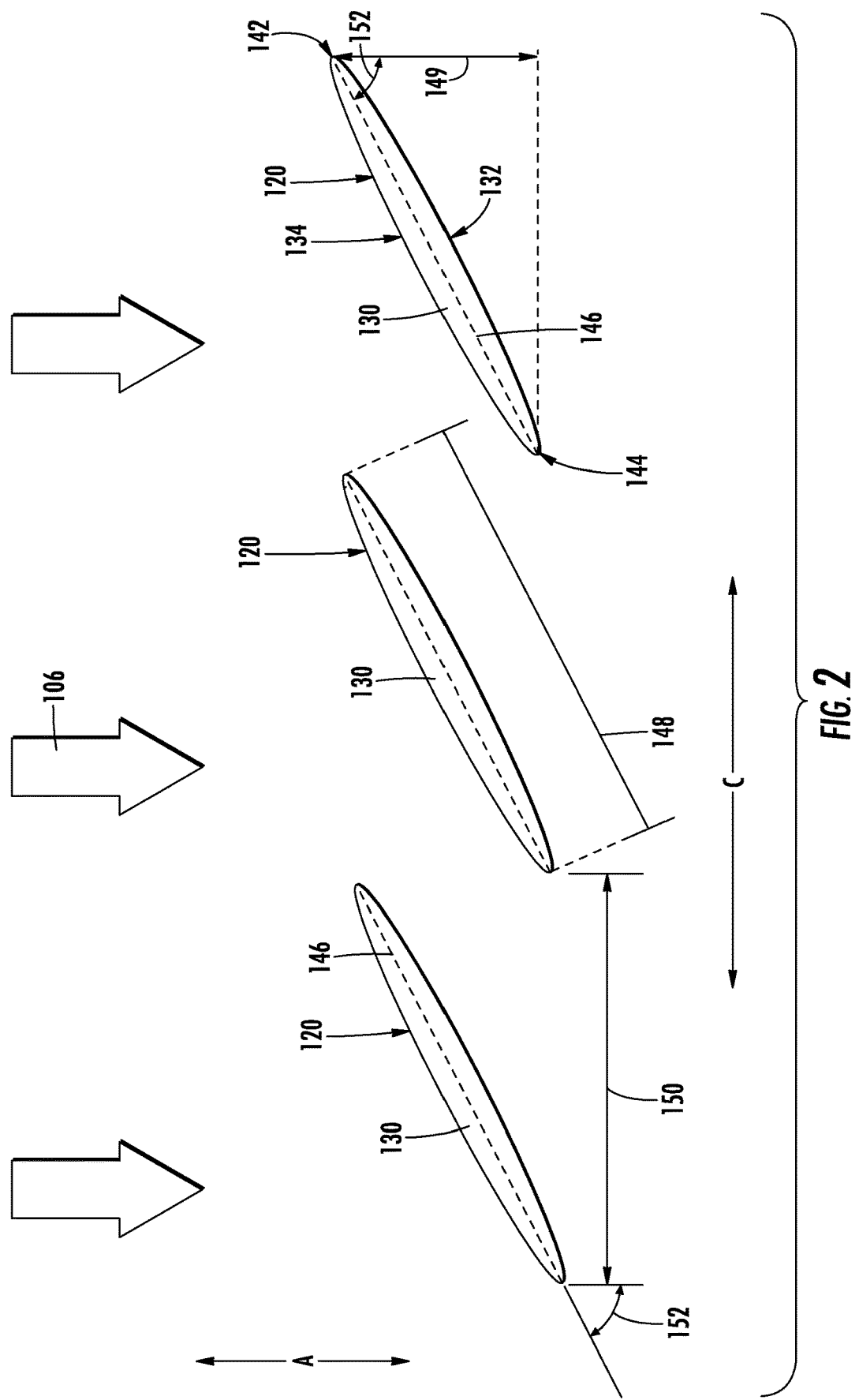
FIG. 2 provides a schematic illustration of a row of fan blades of the exemplary ducted fan of FIG. 1 according to an exemplary embodiment of the present subject matter.

Referring now also to FIG. 2, a schematic illustration of a row of blades 120 of the exemplary ducted fan 100 will be described. As shown, each blade 120 includes an airfoil 130 having a pressure side 132 opposite a suction side 134. Opposite pressure and suction sides 132, 134 of each airfoil 130 extend radially along a blade span 136 from a blade root 138 to a blade tip 140 (see FIG. 1). As depicted, blade root 138 is the radially innermost portion of blade 120 and blade tip 140 is the radially outermost portion of blade 120. Thus, blade root 138 is positioned at or near the inner wall of nacelle 122 proximate drive shaft 112 and blade tip 140 terminates at or near the fan casing 102. Further, it will be readily understood that, as is generally well-known in the art, blade root 138 may define a projection having a dovetail or other shape for receipt in a complementarily shaped slot on the disk to couple blade 120 to the disk of to drive shaft 112.

As further shown in FIG. 2, pressure and suction sides 132, 134 of airfoil 130 extend between a leading edge 142 and an opposite trailing edge 144. Airfoil 130 defines a chord line 146 extending between opposite leading and trailing edges 142, 144. As will be readily understood, a chord line 146 may be defined at each blade span location.

Thus, the length of chord 146 may vary along the blade span 136. When used herein, the term "tip chord length" 148, or simply "chord length," is intended to refer to an average length of chord line 146 at blade tip 140 of airfoil 130. In addition, the term "average" when used to refer to characteristics of the plurality of fan blades 120 is intended to refer to a mathematical average of that characteristic for each of the plurality of fan blades 120. In this regard, the chord length may be referred to as an average chord length to compensate for minor variations between fan blades 120. In addition, the term "tip axial chord length" (see reference numeral 149 in FIG. 2) may be used herein to refer to the tip chord length multiplied by the cosine of the tip stagger angle, taken within the outer 5% of blade span 136 and averaged over the plurality of blades 120. Thus, tip axial chord length is the length of the tip chord projection in the X-R plane; that is, in the main flow (or axial) direction A.

As shown in FIG. 2, a blade pitch 150 is defined between adjacent blades 120 within the row of blades 120. Blade pitch 150 is the circumferential spacing of blades 120 at a given blade span 136. In other words, blade pitch 150 is the circumferential length at a given blade span 136 location divided by the number of blades 120 and accordingly, may vary along blade span 136. For example, blade span 136 may include a plurality of blade span locations and each location may correspond to a fraction or percentage of blade span 136.

Referring still to FIG. 2, the plurality of blades 120 may define a stagger angle 152 that may be optimized to improve performance and/or operability of ducted fan 100. The stagger angle 152 may be defined as the angle between chord line 146 and the axial direction A (e.g., the primary direction of flow of air 106) at a particular cross section or region of blade span 136. Specifically, as used herein, the "tip stagger angle," or sometimes just "stagger angle" or "stagger," is intended to refer to a minimum stagger angle 152 within an outer 5% of blade span 136 along the radial direction R. In other words, the tip stagger angle is defined by the distal region of the blade span 136 of each blade 120, e.g., the region closest to the inner wall 164 of fan casing 102.

As explained above, ducted fan 100 may be configured for operating at low flow coefficients, for example, less than 0.4, less than 0.3, less than 0.2, or lower. In general, a fan flow coefficient is a non-dimensional parameter computed as the volumetric flow through the fan normalized by the product of the fan frontal area and the rotational speed of the blade tip. To achieve such low flow coefficients, according to an exemplary embodiment, each blade 120 may have a tip stagger angle 152 greater than about 68 degrees. According to still other embodiments, the tip stagger angle 152 may be greater than about 74 degrees, greater than about 80 degrees, or even larger up to 90 degrees. Other tip stagger angles 152 may be used as well, but in general, higher stagger angles are frequently desirable for low flow coefficient fans in order to achieve optimal performance and operability.

Figure 3:
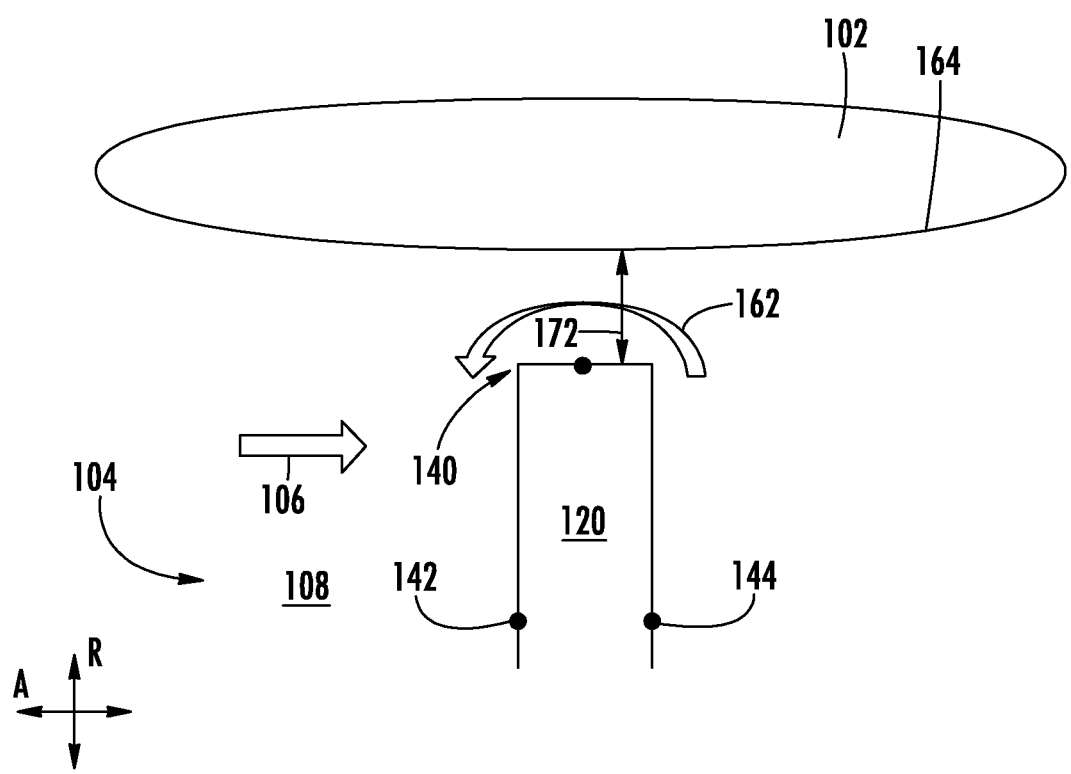
FIG. 3 provides a schematic illustration of the clearance flow over a conventional blade tip.

Notably, as mentioned above, high stagger angles can be associated with decreased efficiency and performance due to conditions related to boundary layer flow at the fan casing, blade vortices, and reverse flow near the fan casing (see FIG. 3). In this regard, high stagger angles and low flow coefficients are associated with higher end wall losses and increased end wall separation due to secondary flows. Therefore, aspects of the present subject matter are directed toward minimizing the adverse effects of these fluid dynamic problems for high stagger, low flow coefficient ducted fans. Although exemplary solutions will be described below, it should be appreciated that variations and modifications may be made to such solutions while remaining within the scope of the present subject matter.

Figure 4:
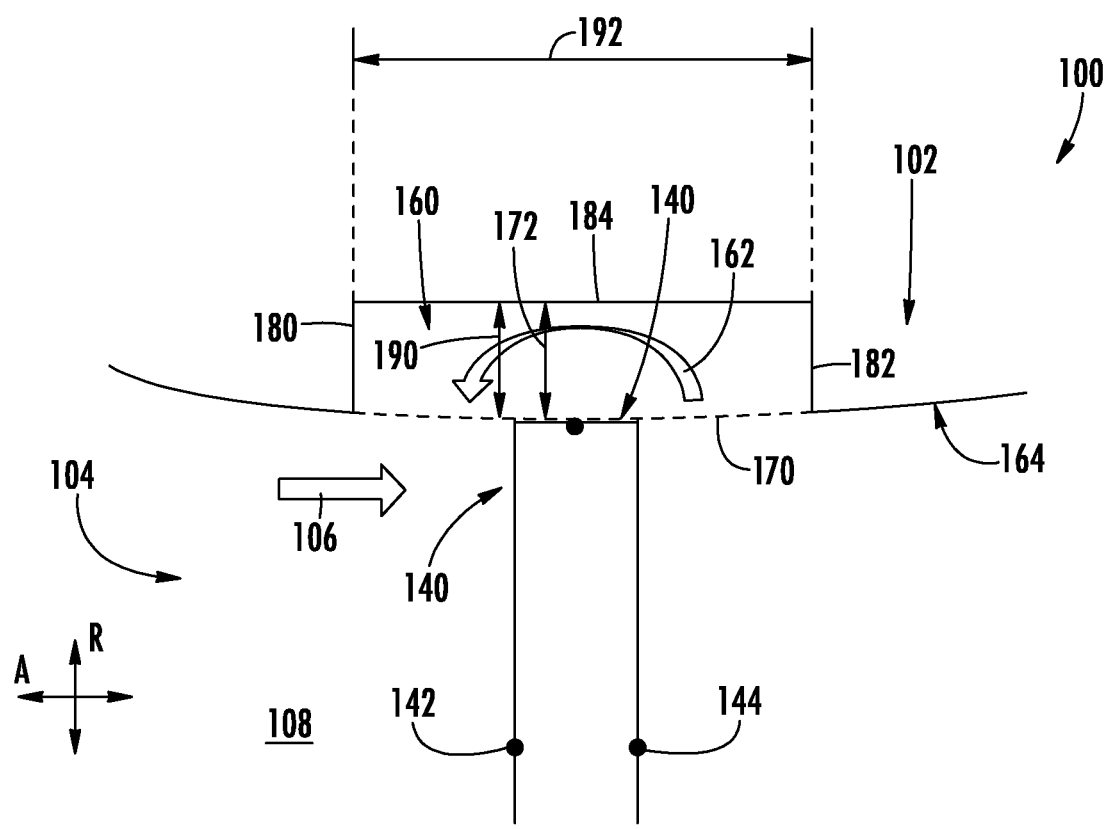
FIG. 4 provides a schematic side view of a blade tip of a blade of the exemplary ducted fan of FIG. 1 according to an exemplary embodiment of the present subject matter.

Referring now specifically to FIG. 4, fan casing 102 may define an annular recess 160 which may be configured for receiving clearance flow (e.g., identified by reference numeral 162) to prevent negative interactions with the main flow of air 106. More specifically, an inner wall 164 that defines the radially innermost surface of fan casing 102 and defines flow passageway 108 may define annular recess 160 as a circumferential groove or slot positioned between blade tips 140 and fan casing 102 along the radial direction R.

As illustrated, a reference surface 170 may be defined as a surface that extends between inner wall 164 forward of annular recess 160 and inner wall 164 aft of annular recess 160. In this regard, reference surface 170 may generally follow the profile of inner wall 164 as if no annular recess 160 existed (e.g., similar to conventional fan casings). According to the illustrated embodiment, blade tips 140 are substantially aligned with reference surface 170. In this manner, clearance flow 162 is generally urged through annular recess 160 instead of flowing contrary to the primary flow of air 106 within flow passageway 108. Notably, such positioning of the blade tips 140 would not be possible with conventional ducted fan designs due to issues related to blade rubs or strikes against fan casing 102.

Although the illustrated embodiment shows blade tips 140 extending along reference surface 170, it should be appreciated that according to alternative embodiments, blades 120 may extend any suitable length into annular recess 160. For example, blade tips 140 may be positioned at least in part within annular recess 160. According to still other embodiments, blade tips 140 may be positioned just outside of annular recess 160. In addition, a tip clearance 172 may be defined between each blade tip 140 and fan casing 102 along the radial direction R. For example, the average tip clearance 172 of all blades may be greater than 10 percent of the tip chord length. In alternative embodiments, the average tip clearance 172 may be greater than 15 percent, greater than 20 percent, greater than 30 percent, or greater, of the tip chord length. According to exemplary embodiments, the average tip clearance 172 of all blades 120 may be less than 1 inch. In alternative embodiments, the average tip clearance 172 may be less than about 0.25 inches, less than about 0.1 inches, or in smaller.

Figure 5:
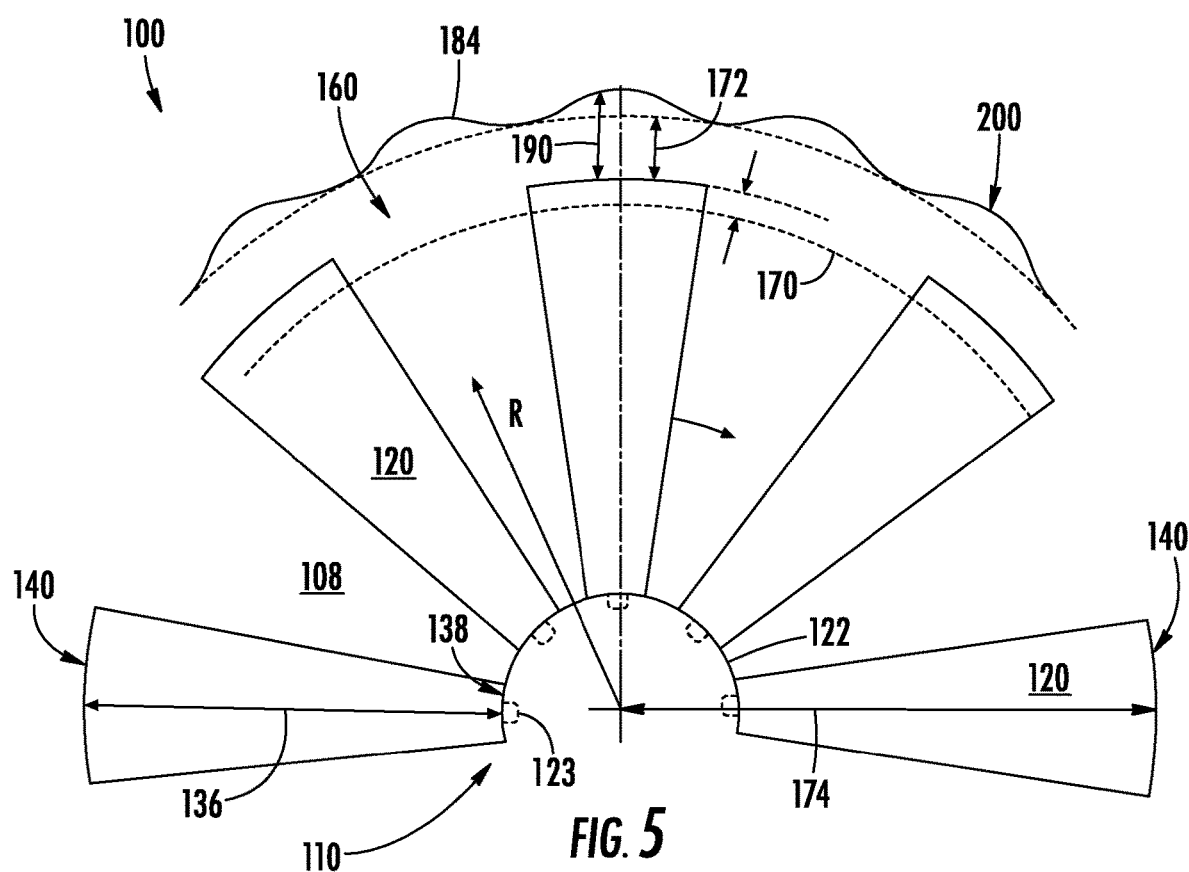
FIG. 5 provides a schematic front view of a ducted fan with an alternative recess shape according to an exemplary embodiment of the present subject matter.

According to exemplary embodiments, the tip clearance may be a clearance ratio defined relative to a blade tip radius 174 (see FIG. 5). As used herein, the tip radius 174 may generally refer to an average tip radius 174 over the plurality of blades 120. For example, a clearance ratio may be defined as the average tip clearance (as measured above) over a radius circumscribed by the blade tips 140 of each of the blades 120. In addition, or alternatively, the clearance ratio may be defined as average tip clearance over the blade span 136. According to exemplary embodiments, the clearance ratio relative to blade tip radius 174 may be greater than 1%, greater than 2%, greater than 3%, or greater. Other clearance ratios are possible while remaining within the scope of the present subject matter.

Notably, the dimensions of annular recess 160 may vary while remaining within the scope of the present subject matter. Specifically, computational fluid dynamics or other suitable flow analysis may be used to determine the desirable profiles and geometries of annular recess 160 for a particular application. The exemplary configuration and geometry described herein is not intended to limit the scope of the present subject matter.

As illustrated, annular recess 160 is generally defined by a forward wall 180, an aft wall 182, and an end wall 184, which all extend circumferentially around fan casing 102. As shown, annular recess 160 defines a substantially rectangular cross-section, such that inner wall 164 turns approximately 90 degrees at the transition between a forward portion of inner wall 164 and forward wall 180, at the transition between a forward wall 180 and end wall 184, at the transition between end wall 184 and aft wall 182, and at the transition between aft wall 182 and a downstream portion of the inner wall 164. However, it should be appreciated that according to alternative embodiments, forward wall 180 and aft wall 182 may extend at an angle more or less than 90 degrees from inner wall 164. In addition, walls 180-184 may be curved or provided with a gentle radius according to an exemplary embodiment. Thus, the geometry of annular recess 160 may vary while remaining within the scope of the present subject matter.

Referring still to FIG. 4, annular recess 160 may define an average recess depth 190 which is measured along the radial direction R between reference surface 170 and fan casing 102 (e.g., end wall 184). Specifically, for example, the average recess depth is an average of the recess depth as measured between reference surface 170 and fan casing 102 along the entire chord line 146 of blades 120. Average recess depth 190 may have any suitable size for a particular application for containing blade tip vortices and/or clearance flow 162. For example, the average recess depth 190 may be defined as a percentage of average tip chord length 148 of blades 120. According to exemplary embodiments, the average recess depth is greater than 10% of tip chord length. However, other suitable depths are possible and within the scope of the present subject matter. For example, the recess depth may be greater than 15 percent, greater than 20 percent, greater than 30 percent, or larger, of the tip chord length.

According to exemplary embodiments, the recess depth 190 may also be defined relative to blade tip radius 174. As explained above, the tip radius 174 may generally refer to an average tip radius 174 over the plurality of blades 120. According to an exemplary embodiment, recess depth 190 may be greater than 0.5% of blade tip radius 174. According to still other embodiments, recess depth 190 may be greater than 1%, greater than 1.5%, greater than 2%, greater than 5%, or greater, of blade tip radius 174. In addition, or alternatively, recess depth 190 may be less than 10%, less than 5%, or less than 3%, or blade tip radius 174. It should be appreciated that recess depth 190 may vary while remaining within the scope of the present subject matter.

In addition, annular recess may define a recess length 192 measured along the axial direction A between forward wall 180 and aft wall 182. Recess length 192 may have any suitable size for particular application, e.g., for containing blade tip vortices and/or clearance flow 162. For example, a length ratio may be defined as the recess length 192 over the tip axial chord length 149 of blades 120. According to exemplary embodiments, the length ratio is greater than 1.5. However, other suitable length ratios are possible and within the scope of the present subject matter. For example, the length ratio may be greater than 2, greater than 2.5, greater than 3, or larger.

Ducted fan 100 is described herein according to various exemplary embodiments of the present subject matter. Each embodiment described may have one or more features, characteristics, or dimensions which may be interchangeably implemented on a ducted fan according to additional exemplary embodiments while remaining within the scope of the present subject matter. For example, ducted fan 100 is described herein as having particular stagger angles 152, recess depths 190, recess lengths 192, flow coefficients, and other features or characteristics in various ranges. It should be appreciated that an exemplary ducted fan may include such features or characteristics in any of the specified ranges and in any suitable combination while remaining within the scope of the present subject matter.

For example, ducted fan 100 may have a stagger angle 152 greater than 68 degrees, greater than 74 degrees, greater than 80 degrees, or greater. In addition, or alternatively, annular recess 160 may have a recess depth 190 that is greater than 0.5%, greater than 1%, greater than 1.5%, or greater, than blade tip radius 174. In addition, or alternatively, annular recess 160 may have a recess length 192 that is greater than tip axial chord length 149 plus a percentage of blade tip radius 174, such as 1%, 2%, 3%, or greater, of blade tip radius 174. In addition, or alternatively, ducted fan may have a flow coefficient of less than 0.4, less than 0.3, less than 0.2, or lower. Other ranges, combinations of features, and additional exemplary ducted fans are possible and within the scope of the present subject matter.

Figure 6:
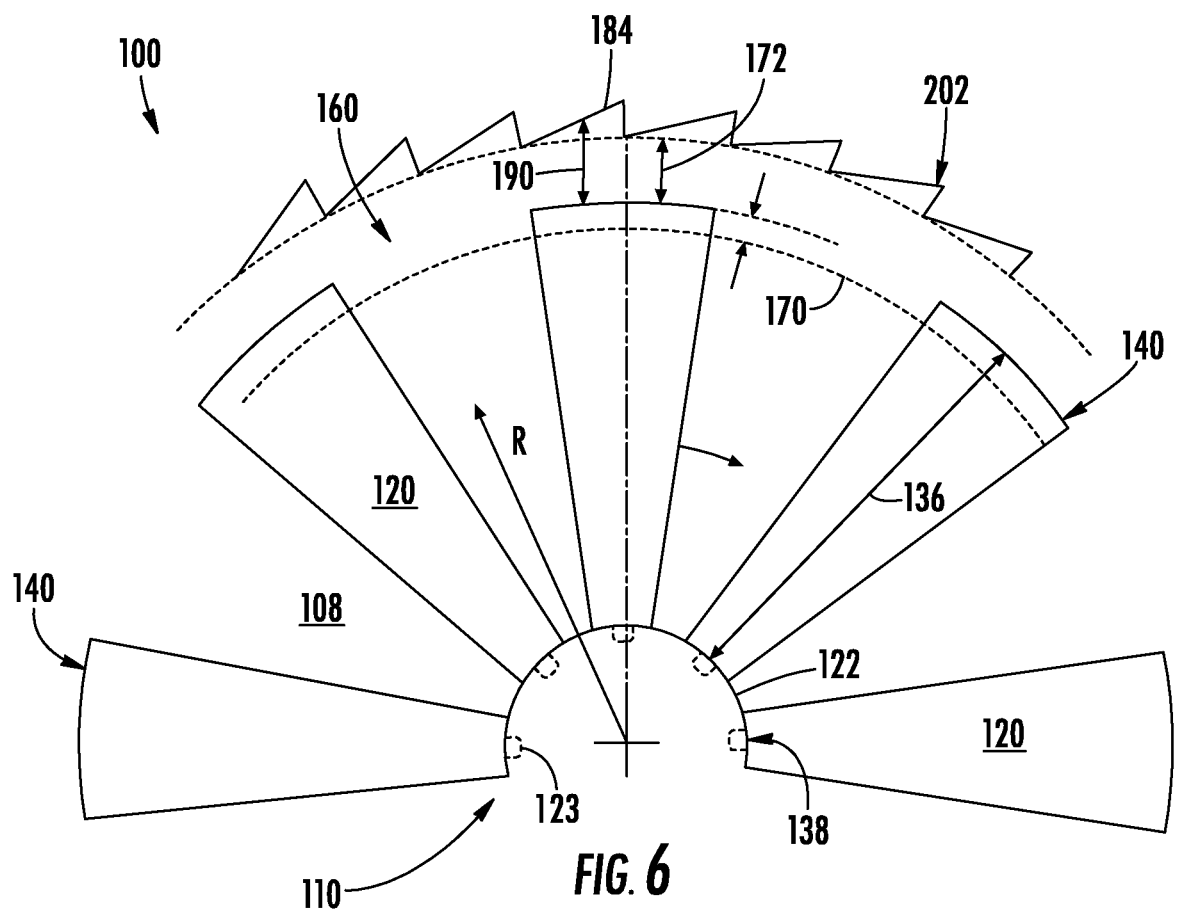
FIG. 6 provides a schematic front view of a ducted fan with an alternative recess shape according to an exemplary embodiment of the present subject matter.
Figure 7:
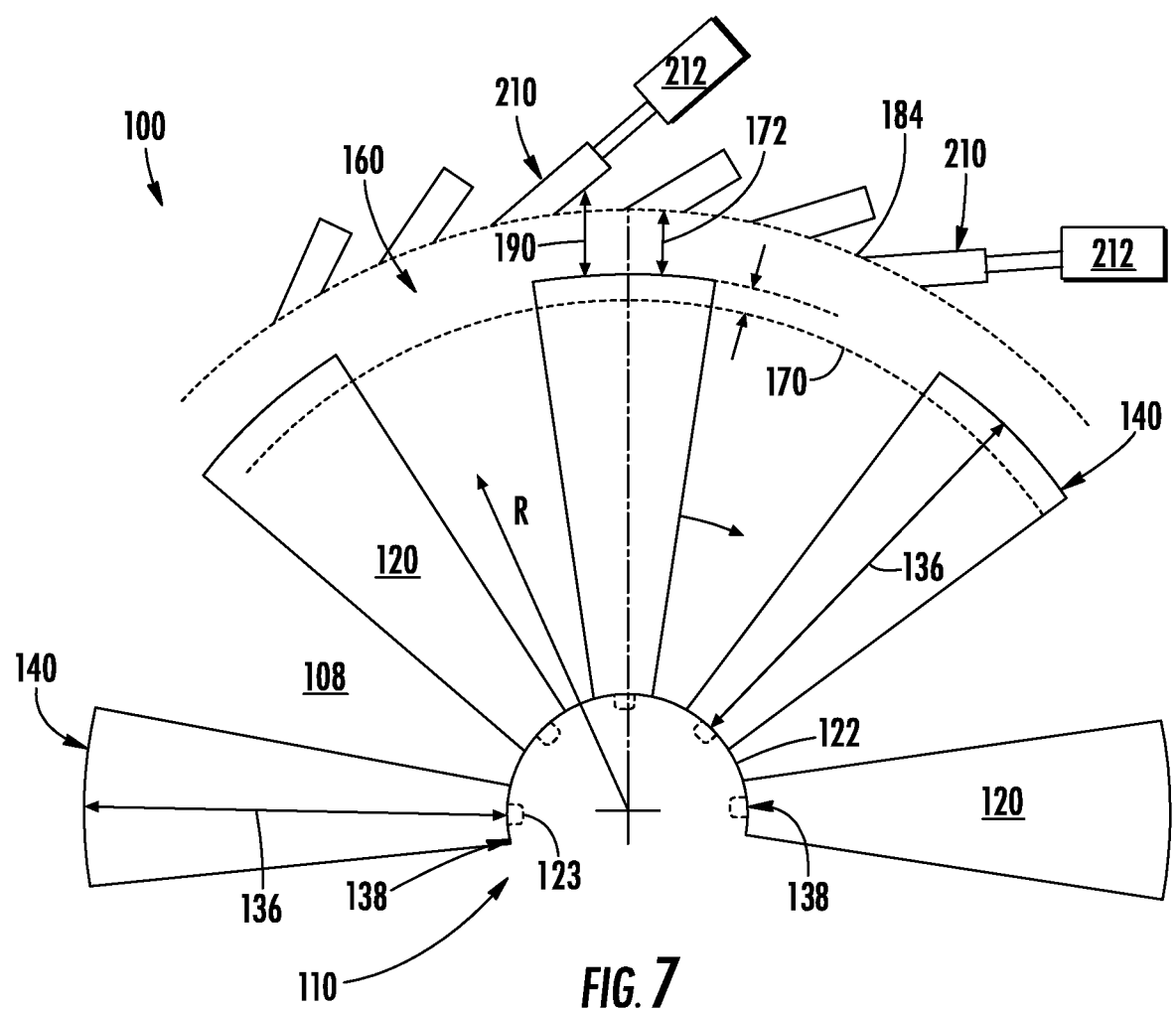
FIG. 7 provides a schematic front view of a ducted fan with an alternative recess shape according to an exemplary embodiment of the present subject matter.

Referring now to FIGS. 5 through 7, ducted fan 100 will be described according to various alternative embodiments of the present subject matter. Due to the similarity between the embodiments described, similar reference numerals will be used to refer to the same or similar features. As illustrated, annular recess 160 may be defined by walls, e.g., such as walls 180-184, that have non-uniform, varying, or otherwise non-axisymmetric profiles. Exemplary profiles and features are described below as being incorporated into ducted fan 100. However, it should be appreciated that variations and modification may be made to the embodiments described while remaining within the scope of the present subject matter. In this regard, for example, the scope of the present invention is not intended to be limited to the specific geometries, features, or configurations described.

Specifically, as shown in FIG. 5, end wall 184 may define a wavy profile (identified generally by reference numeral 200). Specifically, as illustrated, end wall 184 may define wavy profile 200 in the form of circumferential waves, though any undulating, serpentine, irregular, or other suitable shape may be used. In addition, it should be appreciated that such a wavy profile 200 may be incorporated or defined in any one or more of the forward wall 180, aft wall 182, or end wall 184. Other suitable shapes may include, for example, zig-zag shapes (e.g., as identified in FIG. 6 by reference numeral 202), curvilinear shapes, etc.

Referring now specifically to FIG. 7, ducted fan 100 may further include a plurality of slots 210 extending from end wall 184. One or more of slots 210 may be in fluid communication with a bleed cavity 212. In this manner, slots 210 could be used to bleed clearance flow 162 from annular recess 160 at desired circumferential locations through slots 210. According to still other exemplary embodiments, slots may be removed altogether and simple ports may be defined in end wall 184 and placed in fluid communication with bleed cavity 212 or ambient environment.

Recessing the duct inner surface locally over the rotor tip to create an open, relatively large, axisymmetric cavity, and putting the rotor tip at or near the radius of the original (non-recessed) surface, allows much larger clearances to be used while achieving the performance and operability of tight-clearance configurations; for example, at vertical flight and hover conditions. In this regard, by providing an annular recess, the blade tip may be nearly aligned radially with the duct surfaces or inner wall 164 immediately upstream and downstream of the cavity. As such, the aerodynamic effective clearance between the blade tip and adjacent duct surfaces or inner wall 164 is near zero, improving performance and operability. In addition, it is anticipated that aspects of the present subject matter might improve inlet flow distortion tolerance.

According to one theory and exemplary embodiment, aspects of the present subject matter are intended to relocate the tip clearance flow and vortices to a region outside the main flow stream; namely, to the space in the annular recess. To be effective, the cavity may be large enough that the tip vortex stays in the cavity and does not eventually exit or roll out onto the downstream duct wall. Thus, an effective cavity may be relatively large, both in axial extent and radial depth. Also, since the tip clearance is all in the cavity above the main flow path, the blade tip can be aligned radially with the duct walls upstream and downstream of the cavity. This allows the blade tip to energize the flow near the duct wall, adding momentum to deliver a stronger flow to the downstream boundary layer.

Ducted fans with low flow coefficients generally require a relatively tight blade tip clearance for good aerodynamic performance, but this might not be possible or practical. In addition, better aerodynamic performance with a much larger physical clearance may be achieved because the clearance of the blade tip from the inside surfaces of the annular recess can be large while the blade tip section energizes more of the near-casing flow. For example, the large axial length and radial depth of the annular recess are particularly suited for containing blade tip vortices generated by high stagger angle fan blades as described herein. It might also provide more performance/stability margin for a fan operating with inlet duct flow distortion.

A large over-rotor cavity has conventionally been avoided as being expected to substantially degrade aerodynamic performance. However, ducted hover fans with low flow coefficients having high blade tip stagger angles can generate a tip flow and vortex action that directly opposes the duct-wall flow. Such fan designs can benefit from the large cavity, at least at vertical flight and hover operating conditions, when relatively large clearances between the blade tip and duct are desirable.

Further aspects of the invention are provided by the subject matter of the following clauses:

1. A ducted fan defining an axial direction, a radial direction, and a circumferential direction, the ducted fan comprising: a fan casing extending about the circumferential direction and defining a flow passageway; a drive shaft positioned within the fan casing and being rotatable about the axial direction; a plurality of blades operably coupled to the drive shaft and extending substantially along the radial direction toward the fan casing, the plurality of blades defining a tip stagger angle of greater than 68 degrees; and a recess defined by an inner wall of the fan casing, the recess extending about the circumferential direction proximate a blade tip of each of the plurality of blades.

2. The ducted fan of any preceding clause, wherein the recess defines an average recess depth measured along the radial direction, the average recess depth being greater than 0.5 percent of a tip radius of the plurality of blades.

3. The ducted fan of any preceding clause, wherein the recess defines a recess length measured along the axial direction, wherein the recess length is greater than a tip axial chord length plus 1 percent of the tip radius of the plurality of blades.

4. The ducted fan of any preceding clause, wherein the tip stagger angle of the plurality of blades is greater than about 74 degrees.

5. The ducted fan of any preceding clause, wherein the average recess depth is greater than 1 percent of the tip radius of the plurality of blades.

6. The ducted fan of any preceding clause, wherein the recess length is greater than a tip axial chord length plus 2 percent of the tip radius of the plurality of blades.

7. The ducted fan of any preceding clause, wherein the tip stagger angle of the plurality of blades is greater than about 80 degrees.

8. The ducted fan of any preceding clause, wherein the average recess depth is greater than 1.5 percent of the tip radius of the plurality of blades.

9. The ducted fan of any preceding clause, wherein the recess length is greater than the tip axial chord length plus 3 percent of the tip radius of the plurality of blades.

10. The ducted fan of any preceding clause, wherein the blade tip of each of the plurality of blades is substantially aligned with a reference surface that extends between the inner wall forward of the recess and the inner wall aft of the recess.

11. The ducted fan of any preceding clause, wherein the blade tip of each of the plurality of blades is positioned at least partially within the recess.

12. The ducted fan of any preceding clause, wherein the annular recess is axisymmetric.

13. A ducted fan defining an axial direction, a radial direction, and a circumferential direction, the ducted fan comprising: a fan casing extending about the circumferential direction and defining a flow passageway; a drive shaft positioned within the fan casing and being rotatable about the axial direction; a plurality of blades operably coupled to the drive shaft and extending substantially along the radial direction toward the fan casing, the plurality of blades of the ducted fan operating at a flow coefficient based on a blade tip speed of less than 0.4; and a recess defined by an inner wall of the fan casing, the recess extending about the circumferential direction proximate a blade tip of each of the plurality of blades.

14. The ducted fan of any preceding clause, wherein the recess defines an average recess depth measured along the radial direction, the average recess depth being greater than 0.5 percent of a tip radius of the plurality of blades.

15. The ducted fan of any preceding clause, wherein the recess defines a recess length measured along the axial direction, wherein the recess length is greater than a tip axial chord length plus 2 percent of the tip radius of the plurality of blades.

16. The ducted fan of any preceding clause, wherein the flow coefficient of the ducted fan is less than 0.25.

17. The ducted fan of any preceding clause, wherein the average recess depth is greater than 1.5 percent of the tip radius of the plurality of blades.

18. The ducted fan of any preceding clause, wherein the blade tip of each of the plurality of blades is positioned at least partially within the recess.

19. The ducted fan of any preceding clause, wherein the annular recess is axisymmetric.

20. A ducted fan defining an axial direction, a radial direction, and a circumferential direction, the ducted fan comprising: a fan casing extending about the circumferential direction and defining a flow passageway; a drive shaft positioned within the fan casing and being rotatable about the axial direction; a plurality of blades operably coupled to the drive shaft and extending substantially along the radial direction toward the fan casing; and a recess defined by an inner wall of the fan casing proximate a blade tip of each of the plurality of blades, wherein the recess defines an average recess depth measured along the radial direction, the average recess depth being greater than 1.0 percent of a tip radius of the plurality of blades.

21. The ducted fan of any preceding clause, wherein the recess defines a recess length measured along the axial direction, wherein the recess length is greater than a tip axial chord length plus 2 percent of a tip radius of the plurality of blades.

22. The ducted fan of any preceding clause, wherein the plurality of blades define a tip stagger angle of greater than 68 degrees.

23. The ducted fan of any preceding clause, wherein an average tip clearance is defined between the blade tip of each of the plurality of blades and the inner wall of the fan casing, the average tip clearance being greater than 1 percent of a radius circumscribed by the blade tip of each of the plurality of blades.

24. The ducted fan of any preceding clause, wherein the annular recess is axisymmetric.

25. The ducted fan of any preceding clause, wherein the blade tip of each of the plurality of blades is positioned at least partially within the recess.

26. The ducted fan of any preceding clause, wherein the blade tip of each of the plurality of blades is positioned at least partially within the recess.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A ducted fan defining an axial direction, a radial direction, and a circumferential direction, the ducted fan comprising:
 a fan casing extending about the circumferential direction and defining a flow passageway;
 a drive shaft positioned within the fan casing and being rotatable about the axial direction;
 a plurality of blades operably coupled to the drive shaft and extending substantially along the radial direction toward the fan casing, the plurality of blades defining a tip stagger angle of greater than 68 degrees; and
 a permanent recess defined by an inner wall of the fan casing, the recess extending about the circumferential direction proximate a blade tip of each of the plurality of blades.

2. The ducted fan of claim 1, wherein the recess defines an average recess depth measured along the radial direction, the average recess depth being greater than 0.5 percent of a tip radius of the plurality of blades.

3. The ducted fan of claim 2, wherein the recess defines a recess length measured along the axial direction, wherein the recess length is greater than a tip axial chord length plus 1 percent of the tip radius of the plurality of blades.

4. The ducted fan of claim 3, wherein the tip stagger angle of the plurality of blades is greater than about 74 degrees.

5. The ducted fan of claim 4, wherein the average recess depth is greater than 1 percent of the tip radius of the plurality of blades.

6. The ducted fan of claim 5, wherein the recess length is greater than a tip axial chord length plus 2 percent of the tip radius of the plurality of blades.

7. The ducted fan of claim 6, wherein the tip stagger angle of the plurality of blades is greater than about 80 degrees.

8. The ducted fan of claim 7, wherein the average recess depth is greater than 1.5 percent of the tip radius of the plurality of blades.

9. The ducted fan of claim 8, wherein the recess length is greater than the tip axial chord length plus 3 percent of the tip radius of the plurality of blades.

10. The ducted fan of claim 3, wherein the blade tip of each of the plurality of blades is substantially aligned with a reference surface that extends between the inner wall forward of the recess and the inner wall aft of the recess.

11. The ducted fan of claim 3, wherein the blade tip of each of the plurality of blades is positioned at least partially within the recess.

12. The ducted fan of claim 3, wherein the annular recess is axisymmetric.

13. A ducted fan defining an axial direction, a radial direction, and a circumferential direction, the ducted fan comprising:
a fan casing extending about the circumferential direction and defining a flow passageway;
a drive shaft positioned within the fan casing and being rotatable about the axial direction;
a plurality of blades operably coupled to the drive shaft and extending substantially along the radial direction toward the fan casing, the plurality of blades of the ducted fan with a flow coefficient, determined based on a blade tip speed, of less than 0.4; and
a permanent recess defined by an inner wall of the fan casing, the recess extending about the circumferential direction proximate a blade tip of each of the plurality of blades.

14. The ducted fan of claim 13, wherein the recess defines an average recess depth measured along the radial direction, the average recess depth being greater than 0.5 percent of a tip radius of the plurality of blades.

15. The ducted fan of claim 14, wherein the recess defines a recess length measured along the axial direction, wherein the recess length is greater than a tip axial chord length plus 2 percent of the tip radius of the plurality of blades.

16. The ducted fan of claim 15, wherein the flow coefficient of the ducted fan is less than 0.25.

17. The ducted fan of claim 16, wherein the average recess depth is greater than 1.5 percent of the tip radius of the plurality of blades.

18. The ducted fan of claim 13, wherein the blade tip of each of the plurality of blades is positioned at least partially within the recess.

19. The ducted fan of claim 13, wherein the annular recess is axisymmetric.

20. A ducted fan defining an axial direction, a radial direction, and a circumferential direction, the ducted fan comprising:
a fan casing extending about the circumferential direction and defining a flow passageway;
a drive shaft positioned within the fan casing and being rotatable about the axial direction;
a plurality of blades operably coupled to the drive shaft and extending substantially along the radial direction toward the fan casing; and
a permanent recess defined by an inner wall of the fan casing proximate a blade tip of each of the plurality of blades, wherein the recess defines an average recess depth measured along the radial direction, the average recess depth being greater than 1.0 percent of a tip radius of the plurality of blades.

21. The ducted fan of claim 20, wherein the recess defines a recess length measured along the axial direction, wherein the recess length is greater than a tip axial chord length plus 2 percent of a tip radius of the plurality of blades.

22. The ducted fan of claim 21, wherein the plurality of blades define a tip stagger angle of greater than 68 degrees.

23. The ducted fan of claim 20, wherein an average tip clearance is defined between the blade tip of each of the plurality of blades and the inner wall of the fan casing, the average tip clearance being greater than 1 percent of a radius circumscribed by the blade tip of each of the plurality of blades.

24. The ducted fan of claim 20, wherein the annular recess is axisymmetric.

25. The ducted fan of claim 20, wherein the blade tip of each of the plurality of blades is positioned at least partially within the recess.

26. The ducted fan of claim 6, wherein the blade tip of each of the plurality of blades is positioned at least partially within the recess.

* * * * *